United States Patent
Berry (10) Patent No.: US 11,156,362 B2
(45) Date of Patent: Oct. 26, 2021

(54) COMBUSTOR WITH AXIALLY STAGED FUEL INJECTION

(71) Applicant: General Electric Company, Schenectady, NY (US)

(72) Inventor: Jonathan Dwight Berry, Simpsonville, SC (US)

(73) Assignee: General Electric Company, Schenectady, NY (US)

(*) Notice: Subject to any disclaimer, the term of this patent is extended or adjusted under 35 U.S.C. 154(b) by 22 days.

(21) Appl. No.: 16/715,207

(22) Filed: Dec. 16, 2019

(65) Prior Publication Data

US 2020/0141583 A1 May 7, 2020

Related U.S. Application Data

(63) Continuation-in-part of application No. 15/361,840, filed on Nov. 28, 2016, now Pat. No. 10,690,350.

(51) Int. Cl.
*F23R 3/00* (2006.01)
*F23R 3/28* (2006.01)
*F23R 3/34* (2006.01)
*F02C 7/22* (2006.01)

(52) U.S. Cl.
CPC ............ *F23R 3/286* (2013.01); *F23R 3/346* (2013.01); *F02C 7/22* (2013.01); *F23R 3/283* (2013.01)

(58) Field of Classification Search
CPC ........... F23R 3/286; F23R 3/346; F23R 3/283
See application file for complete search history.

(56) References Cited

U.S. PATENT DOCUMENTS

| 2,595,999 A | 5/1952 | Way et al. |
| 2,625,792 A | 1/1953 | McCarthy et al. |
| 3,657,882 A | 4/1972 | Hugoson |
| 3,657,883 A | 4/1972 | DeCorso |
| 3,750,398 A | 8/1973 | Adeelizzi et al. |
| 4,016,718 A | 4/1977 | Lauck |
| 4,158,949 A | 6/1979 | Reider |
| 4,195,474 A | 4/1980 | Bintz et al. |
| 4,297,843 A | 11/1981 | Sato et al. |
| 4,373,327 A | 2/1983 | Adkins |

(Continued)

FOREIGN PATENT DOCUMENTS

WO   WO2014/191495 A1   12/2014

OTHER PUBLICATIONS

Nishimura, et al., The Approach to the Development of the Next Generation Gas Turbine and History of Tohoku Electric Power Company Combined Cycle Power Plants, GT2011-45464, Proceedings of ASME Turbo Expo 2011, Vancouver, British Columbia, Canada, Jun. 6-10, 2011, pp. 1-6.

*Primary Examiner* — Katheryn A Malatek
(74) *Attorney, Agent, or Firm* — Dority & Manning, P.A.

(57) ABSTRACT

A combustor with axially staged fuel injection includes an endcover and a fuel injector that extends axially downstream from the endcover. The fuel injector includes a cylindrical shell formed by an outer wall and an inner wall. A first plurality of outlets is circumferentially spaced across the inner wall. A first plurality of premix channels is defined between the outer wall and the inner wall. Each premix channel of the first plurality of premix channels is in fluid communication with a fuel supply, a compressed air supply and a respective outlet of the first plurality of outlets.

20 Claims, 10 Drawing Sheets

(56) References Cited

U.S. PATENT DOCUMENTS

| | | |
|---|---|---|
| 4,413,470 A | 11/1983 | Scheihing et al. |
| 4,422,288 A | 12/1983 | Steber |
| 4,614,082 A | 9/1986 | Sterman et al. |
| 4,719,748 A | 1/1988 | Davis, Jr. et al. |
| 4,720,970 A | 1/1988 | Hudson et al. |
| 4,819,438 A | 4/1989 | Schultz |
| 4,843,825 A | 7/1989 | Clark |
| 4,903,477 A | 2/1990 | Butt |
| 5,237,813 A | 8/1993 | Harris et al. |
| 5,239,818 A | 8/1993 | Stickles et al. |
| 5,297,385 A | 3/1994 | Dubell et al. |
| 5,628,192 A | 5/1997 | Hayes-Bradley |
| 5,640,851 A | 6/1997 | Toon et al. |
| 5,761,898 A | 6/1998 | Barnes et al. |
| 5,826,430 A | 10/1998 | Little |
| 5,906,093 A | 5/1999 | Coslow et al. |
| 5,924,288 A | 7/1999 | Fortuna et al. |
| 5,960,632 A | 10/1999 | Abuaf et al. |
| 6,082,111 A | 7/2000 | Stokes |
| 6,085,514 A | 7/2000 | Benim et al. |
| 6,098,397 A | 8/2000 | Glezer et al. |
| 6,109,019 A | 8/2000 | Sugishita |
| 6,116,013 A | 9/2000 | Moller |
| 6,116,018 A | 9/2000 | Tanimura et al. |
| 6,276,142 B1 | 8/2001 | Putz |
| 6,298,656 B1 | 10/2001 | Donovan et al. |
| 6,345,494 B1 | 2/2002 | Coslow |
| 6,374,593 B1 | 4/2002 | Ziegner |
| 6,412,268 B1 | 7/2002 | Cromer et al. |
| 6,450,762 B1 | 9/2002 | Munshi |
| 6,463,742 B2 | 10/2002 | Mandai et al. |
| 6,523,352 B1 | 2/2003 | Takahashi et al. |
| 6,546,627 B1 | 4/2003 | Sekihara et al. |
| 6,568,187 B1 | 5/2003 | Jorgensen et al. |
| 6,619,915 B1 | 9/2003 | Jorgensen |
| 6,644,032 B1 | 11/2003 | Jorgensen et al. |
| 7,010,921 B2 | 3/2006 | Intile et al. |
| 7,056,093 B2 | 6/2006 | Self et al. |
| 7,310,938 B2 | 12/2007 | Marcum et al. |
| 7,334,960 B2 | 2/2008 | Glessner et al. |
| RE40,658 E | 3/2009 | Powis et al. |
| 7,665,309 B2 | 2/2010 | Parker et al. |
| 7,874,138 B2 | 1/2011 | Rubio et al. |
| 7,886,517 B2 | 2/2011 | Chopra et al. |
| 8,015,818 B2 | 9/2011 | Wilson et al. |
| 8,104,292 B2 | 1/2012 | Lee et al. |
| 8,151,570 B2 | 4/2012 | Jennings et al. |
| 8,272,218 B2 | 9/2012 | Fox et al. |
| 8,281,594 B2 | 10/2012 | Wiebe |
| 8,281,595 B2 | 10/2012 | Davis, Jr. et al. |
| 8,375,726 B2 | 2/2013 | Wiebe et al. |
| 8,387,391 B2 | 3/2013 | Patel et al. |
| 8,387,398 B2 | 3/2013 | Martin et al. |
| 8,499,566 B2 | 8/2013 | Lacy et al. |
| 8,511,086 B1 | 8/2013 | Uhm et al. |
| 8,549,861 B2 | 10/2013 | Huffman |
| 8,752,386 B2 | 6/2014 | Fox et al. |
| 9,016,066 B2 | 4/2015 | Wiebe et al. |
| 9,255,490 B2 | 2/2016 | Mizukami et al. |
| 9,512,781 B2 | 12/2016 | Mizukami et al. |
| 10,087,844 B2 | 10/2018 | Hughes et al. |
| 10,247,103 B2 | 4/2019 | Word et al. |
| 2002/0043067 A1 | 4/2002 | Maeda |
| 2002/0112483 A1 | 8/2002 | Kondo et al. |
| 2003/0140633 A1 | 7/2003 | Shimizu et al. |
| 2003/0167776 A1 | 9/2003 | Coppola |
| 2003/0192320 A1 | 10/2003 | Farmer et al. |
| 2005/0223713 A1 | 10/2005 | Ziminsky et al. |
| 2006/0038326 A1 | 2/2006 | Vecchiet et al. |
| 2006/0248898 A1 | 11/2006 | Buelow et al. |
| 2008/0006033 A1 | 1/2008 | Scarinci |
| 2008/0208513 A1 | 8/2008 | Dupuy et al. |
| 2009/0113893 A1 | 5/2009 | Li |
| 2009/0223227 A1 | 9/2009 | Lipinski et al. |
| 2009/0277177 A1 | 11/2009 | Hessler |
| 2010/0058766 A1 | 3/2010 | McMahan et al. |
| 2010/0077719 A1 | 4/2010 | Wilson et al. |
| 2010/0139280 A1 | 6/2010 | Lacy et al. |
| 2010/0186413 A1 | 7/2010 | Lacy et al. |
| 2010/0205970 A1 | 8/2010 | Hessler et al. |
| 2010/0287946 A1 | 11/2010 | Buelow et al. |
| 2011/0113783 A1* | 5/2011 | Boardman ............. F23C 13/06 60/723 |
| 2011/0209482 A1 | 9/2011 | Toqan et al. |
| 2012/0151928 A1 | 6/2012 | Patel et al. |
| 2012/0151929 A1 | 6/2012 | Patel et al. |
| 2012/0151930 A1 | 6/2012 | Patel et al. |
| 2012/0174590 A1 | 7/2012 | Krull et al. |
| 2012/0180487 A1 | 7/2012 | Uhm et al. |
| 2012/0180495 A1 | 7/2012 | Uhm et al. |
| 2013/0086912 A1 | 4/2013 | Berry |
| 2013/0104556 A1 | 5/2013 | Uhm et al. |
| 2013/0122438 A1 | 5/2013 | Stoia et al. |
| 2013/0167539 A1 | 7/2013 | Berry |
| 2013/0299602 A1 | 11/2013 | Hughes et al. |
| 2014/0033718 A1 | 2/2014 | Manoharan et al. |
| 2014/0157779 A1 | 6/2014 | Uhm et al. |
| 2014/0245738 A1 | 9/2014 | Crothers et al. |
| 2014/0260257 A1 | 9/2014 | Rullaud et al. |
| 2014/0373548 A1 | 12/2014 | Hasselqvist et al. |
| 2015/0047361 A1 | 2/2015 | Williams et al. |
| 2015/0076251 A1* | 3/2015 | Berry ..................... F23R 3/10 239/418 |
| 2015/0082796 A1 | 3/2015 | Andersson et al. |
| 2015/0135716 A1 | 5/2015 | Ginessin et al. |
| 2015/0135718 A1* | 5/2015 | Hughes .................... F23R 3/10 60/738 |
| 2015/0165568 A1* | 6/2015 | Means .................... B23P 6/005 29/402.06 |
| 2015/0167983 A1* | 6/2015 | McConnaughhay ... F23R 3/286 60/726 |
| 2015/0219336 A1 | 8/2015 | Crothers et al. |
| 2016/0033132 A1 | 2/2016 | Venkatesan et al. |
| 2016/0061453 A1 | 3/2016 | Bethke |
| 2016/0146460 A1 | 5/2016 | Stewart et al. |
| 2016/0146469 A1 | 5/2016 | Lum et al. |
| 2016/0178202 A1 | 6/2016 | Antoniono et al. |
| 2016/0223201 A1 | 8/2016 | Zink |
| 2017/0038074 A1 | 2/2017 | Myers et al. |
| 2017/0122562 A1 | 5/2017 | Berry |
| 2017/0138595 A1 | 5/2017 | Berry et al. |
| 2017/0219211 A1 | 8/2017 | Kajimura et al. |
| 2017/0248318 A1 | 8/2017 | Kulkarni |
| 2017/0254539 A1 | 9/2017 | Melton et al. |
| 2017/0261209 A9 | 9/2017 | Ginessin et al. |
| 2017/0276357 A1 | 9/2017 | Berry et al. |
| 2017/0276358 A1 | 9/2017 | Berry et al. |
| 2017/0276359 A1 | 9/2017 | Berry et al. |
| 2017/0276360 A1 | 9/2017 | Berry et al. |
| 2017/0276361 A1 | 9/2017 | Berry et al. |
| 2017/0276362 A1* | 9/2017 | Berry ..................... F02C 7/18 |
| 2017/0276363 A1 | 9/2017 | Berry et al. |
| 2017/0276364 A1 | 9/2017 | Berry et al. |
| 2017/0276365 A1 | 9/2017 | Berry et al. |
| 2017/0276366 A1 | 9/2017 | Berry et al. |
| 2017/0276369 A1 | 9/2017 | Berry et al. |
| 2017/0298827 A1 | 10/2017 | Berry et al. |
| 2017/0299185 A1 | 10/2017 | Berry et al. |
| 2017/0299186 A1 | 10/2017 | Berry et al. |
| 2017/0299187 A1 | 10/2017 | Berry et al. |
| 2017/0363293 A1 | 12/2017 | Grooms et al. |
| 2018/0172276 A1 | 6/2018 | Bailey et al. |
| 2018/0187603 A1 | 7/2018 | Berry |
| 2019/0056112 A1 | 2/2019 | Natarajan et al. |

* cited by examiner

COMBUSTOR WITH AXIALLY STAGED FUEL INJECTION

CROSS REFERENCE TO RELATED APPLICATIONS

The present application is a continuation-in-part of U.S. patent application Ser. No. 15/361,840, filed Nov. 28, 2016, the disclosure of which is incorporated by reference herein in its entirety.

STATEMENT REGARDING FEDERALLY SPONSORED RESEARCH OR DEVELOPMENT

This invention was made with Government support under Contract No. DE-FE0023965 awarded by the United States Department of Energy. The Government has certain rights in this invention.

FIELD

The present invention generally involves a combustor for a gas turbine. More specifically, the invention relates to a combustor having axially staged fuel injection.

BACKGROUND

It is generally advantageous to minimize emissions such as nitrogen oxides (NOx), carbon monoxide, and unburned hydrocarbons of combustion gases created in a combustor of a gas turbine engine. Axial staging combustion is one approach for reducing such emissions. Axially staged combustion generally includes injecting a secondary fuel and air mixture from one or more radially oriented fuel injectors into a flow of combustion gases at a location that is downstream from a primary combustion zone. However, even with axial staging, NOx is produced in higher amounts at higher flame temperatures.

NOx emissions can be reduced by lowering the flame temperature and/or lowering the residence time of the combustion gases in high temperature zones. In contrast, as compared with NOx emissions, a longer residence time and higher temperature favors low carbon monoxide emissions. In order to balance NOx and CO emissions and to protect combustion hardware, traditional axially staged combustion systems require a large combustion volume and, as such, a high volume of cooling air which may affect overall gas turbine efficiency.

BRIEF DESCRIPTION

Aspects and advantages are set forth below in the following description, or may be obvious from the description, or may be learned through practice.

One embodiment of the present disclosure is a combustor. The combustor includes a plurality of nozzle segments annularly arranged about a center fuel nozzle. Each nozzle segment of the plurality of nozzle segments includes a fuel plenum at least partially defined between the forward plate and the aft plate. The nozzle segment further includes a plurality of tubes that extends through the forward plate, the fuel plenum and the aft plate and a panel fuel injector that extends axially downstream from the aft plate. The panel fuel injector includes an outer wall having an arcuate shape and an inner wall having an arcuate shape. A plurality of outlets is defined along at least one of the outer wall and the inner wall. A plurality of premix channels is defined between the outer wall and the inner wall. Each channel of the plurality of premix channels is in fluid communication with a fuel supply, a compressed air supply and a respective outlet of the plurality of outlets.

Another embodiment of the present disclosure is a combustor. The combustor includes a combustion liner and a plurality of nozzle segments annularly arranged about a center fuel nozzle. An upstream end of the combustion liner circumferentially surrounds the plurality of nozzle segments. Each nozzle segment of the plurality of nozzle segments includes a fuel plenum that is at least partially defined between a forward plate and an aft plate. A plurality of tubes extends through the forward plate, the fuel plenum and the aft plate. The nozzle segment further includes a panel fuel injector that extends axially downstream from the aft plate. The panel fuel injector includes an outer wall having an arcuate shape. The outer wall may be disposed radially inwardly from the combustion liner. The panel fuel injector further includes an inner wall having an arcuate shape. The inner wall may be disposed radially outwardly from the center fuel nozzle. A plurality of outlets is defined along at least one of the outer wall and the inner wall, and a plurality of premix channels is defined between the outer wall and the inner wall. Each channel of the plurality of premix channels is in fluid communication with a fuel supply, a compressed air supply and a respective outlet of the plurality of outlets.

Another embodiment of the present disclosure is a combustor. The combustor includes an endcover and a fuel injector that extends axially downstream from the endcover. The fuel injector includes a cylindrical shell formed by an outer wall and an inner wall. A first plurality of outlets is circumferentially spaced across the inner wall. A first plurality of premix channels is defined between the outer wall and the inner wall. Each premix channel of the first plurality of premix channels is in fluid communication with a fuel supply, a compressed air supply and a respective outlet of the first plurality of outlets.

Another embodiment of the present disclosure is a combustor. The combustor includes an endcover, a fuel nozzle that extends downstream from the endcover and a fuel injector that extends axially downstream from the endcover. The fuel injector includes a cylindrical shell formed by an outer wall and an inner wall. A first plurality of outlets is circumferentially spaced across the inner wall, and a first plurality of premix channels is defined between the outer wall and the inner wall. The inner wall defines a primary combustion chamber downstream from the fuel nozzle. Each premix channel of the first plurality of premix channels is in fluid communication with a fuel supply, a compressed air supply and a respective outlet of the first plurality of outlets.

Those of ordinary skill in the art will better appreciate the features and aspects of such embodiments, and others, upon review of the specification.

BRIEF DESCRIPTION OF THE DRAWINGS

A full and enabling disclosure of the of various embodiments, including the best mode thereof to one skilled in the art, is set forth more particularly in the remainder of the specification, including reference to the accompanying figures, in which.

DETAILED DESCRIPTION

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

As used herein, the terms "first," "second," and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows. The term "radially" refers to the relative direction that is substantially perpendicular to an axial centerline of a particular component, the term "axially" refers to the relative direction that is substantially parallel and/or coaxially aligned to an axial centerline of a particular component, and the term "circumferentially" refers to the relative direction that extends around the axial centerline of a particular component.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Each example is provided by way of explanation, not limitation. In fact, it will be apparent to those skilled in the art that modifications and variations can be made without departing from the scope or spirit thereof. For instance, features illustrated or described as part of one embodiment may be used on another embodiment to yield a still further embodiment. Thus, it is intended that the present disclosure covers such modifications and variations as come within the scope of the appended claims and their equivalents. Although exemplary embodiments of the present disclosure will be described generally in the context of a combustor for a land-based power generating gas turbine for purposes of illustration, one of ordinary skill in the art will readily appreciate that embodiments of the present disclosure may be applied to any combustor for a turbomachine and are not limited to combustors or combustion systems for land-based power generating gas turbines unless specifically recited in the claims.

Figure 1:
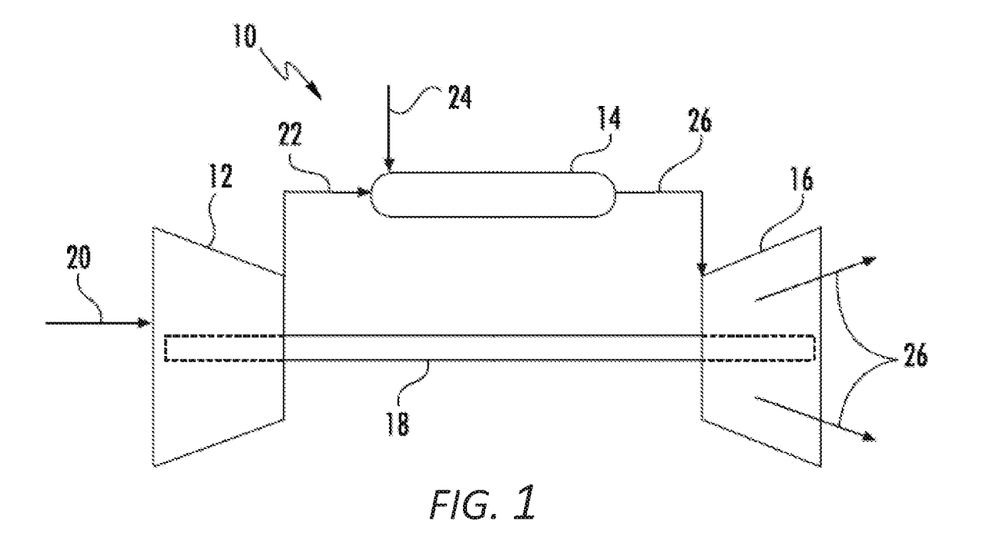
FIG. 1 is a functional block diagram of an exemplary gas turbine that may incorporate various embodiments of the present disclosure.

Referring now to the drawings, FIG. 1 illustrates a schematic diagram of an exemplary gas turbine 10. The gas turbine 10 generally includes a compressor 12, at least one combustor 14 disposed downstream of the compressor 12 and a turbine 16 disposed downstream of the combustor 14. Additionally, the gas turbine 10 may include one or more shafts 18 that couple the compressor 12 to the turbine 16.

During operation, air 20 flows into the compressor 12 where the air 20 is progressively compressed, thus providing compressed or pressurized air 22 to the combustor 14. At least a portion of the compressed air 22 is mixed with a fuel 24 within the combustor 14 and burned to produce combustion gases 26. The combustion gases 26 flow from the combustor 14 into the turbine 16, where energy (kinetic and/or thermal) is transferred from the combustion gases 26 to rotor blades (not shown), thus causing shaft 18 to rotate. The mechanical rotational energy may then be used for various purposes such as to power the compressor 12 and/or to generate electricity. The combustion gases 26 may then be exhausted from the gas turbine 10.

Figure 2A:
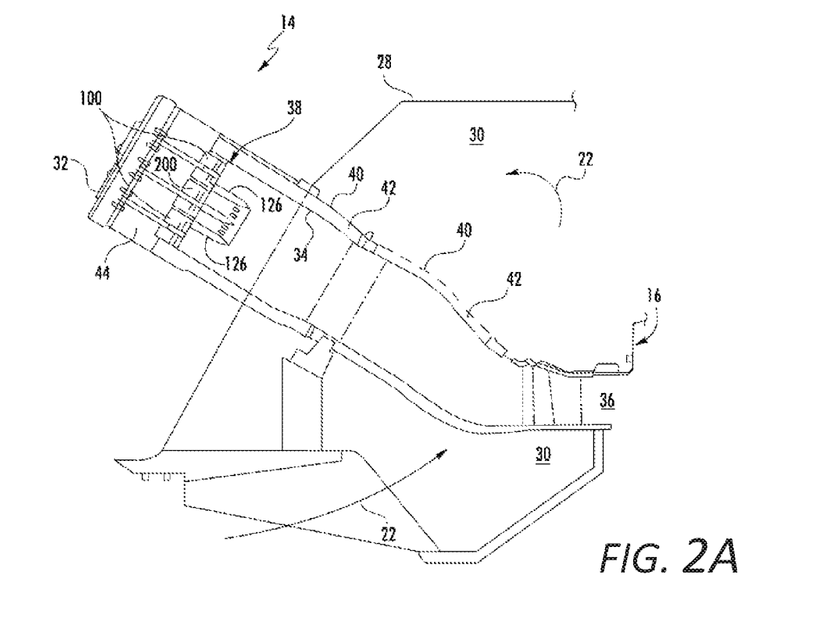
FIG. 2A is a simplified cross-section side view of an exemplary combustor, as may incorporate various embodiments of the present disclosure.
Figure 2B:
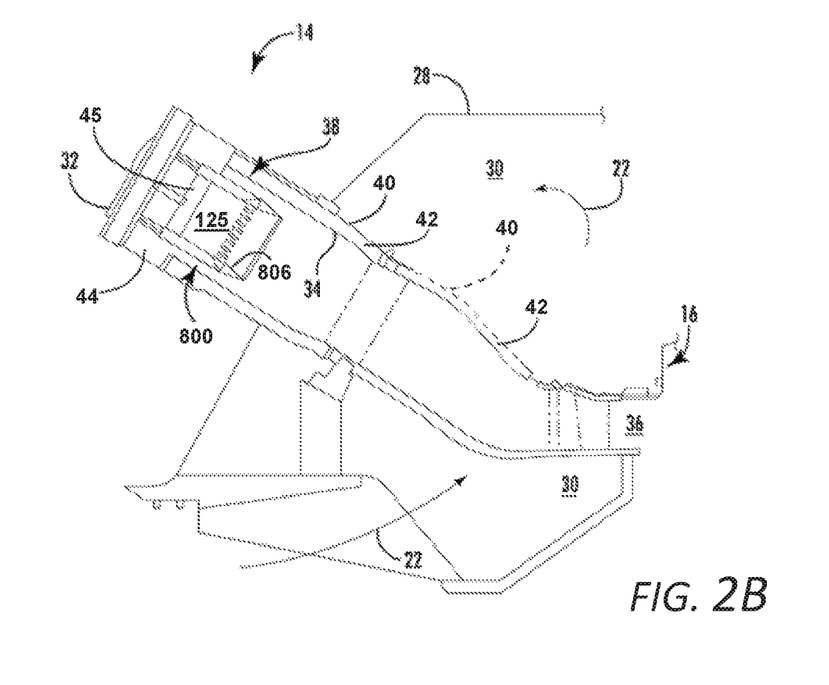
FIG. 2B is a simplified cross-section side view of another exemplary combustor, as may incorporate various embodiments of the present disclosure.

FIGS. 2A and 2B provide a cross-sectioned side view of an exemplary combustor 14 as may incorporated various embodiments of the present disclosure. As shown in FIGS. 2A and 2B, the combustor 14 may be at least partially surrounded by an outer casing 28 such as a compressor discharge casing. The outer casing 28 may at least partially define a high pressure plenum 30 that at least partially surrounds various components of the combustor 14. The high pressure plenum 30 may be in fluid communication with the compressor 12 (FIG. 1) so as to receive the compressed air 22 therefrom. An end cover 32 may be coupled to the outer casing 28.

One or more combustion liners or ducts 34 may at least partially define a hot gas path through the combustor 14 for directing the combustion gases 26 towards an inlet 36 to the turbine 16. In particular embodiments, an upstream or forward end 38 of the combustion liner 34 may be substantially cylindrical or round. In particular embodiments, the combustion liner 34 may be at last partially circumferentially surrounded by a sleeve 40 such as a flow sleeve. The sleeve 40 may be formed as a single component or by multiple flow sleeve segments. The sleeve 40 may be radially spaced from the combustion liner 34 so as to define a flow passage or annular flow passage 42 therebetween. The sleeve 40 may provide for fluid communication between the high pressure plenum 30 and a head end portion or volume 44 of the combustor 14. In particular embodiments, as shown in FIG. 2B, a primary or first fuel nozzle 45 extends downstream from the endcover 32.

Figure 3:
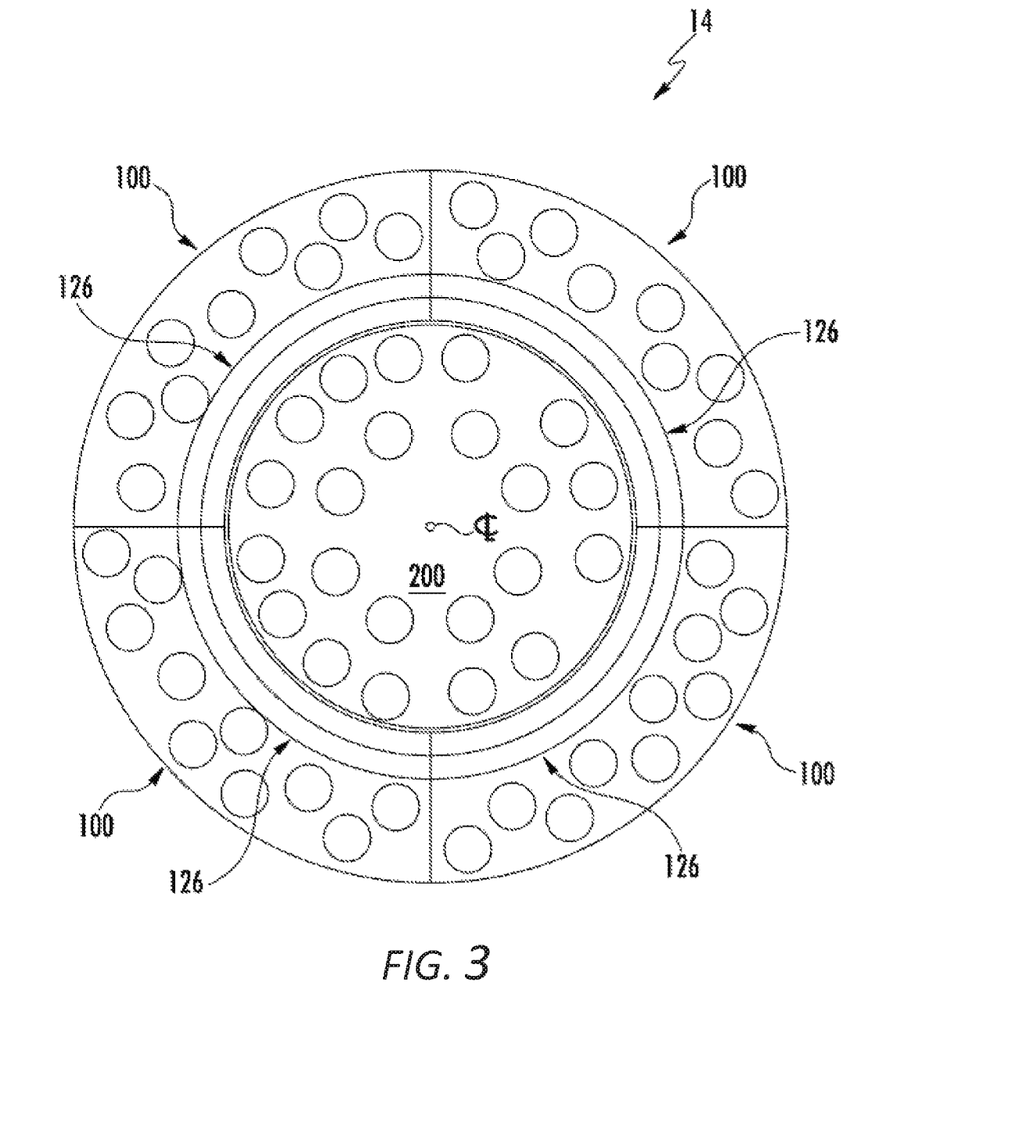
FIG. 3 is an upstream view of a portion of the combustor as shown in FIG. 2A, according to at least one embodiment of the present disclosure.
Figure 4:
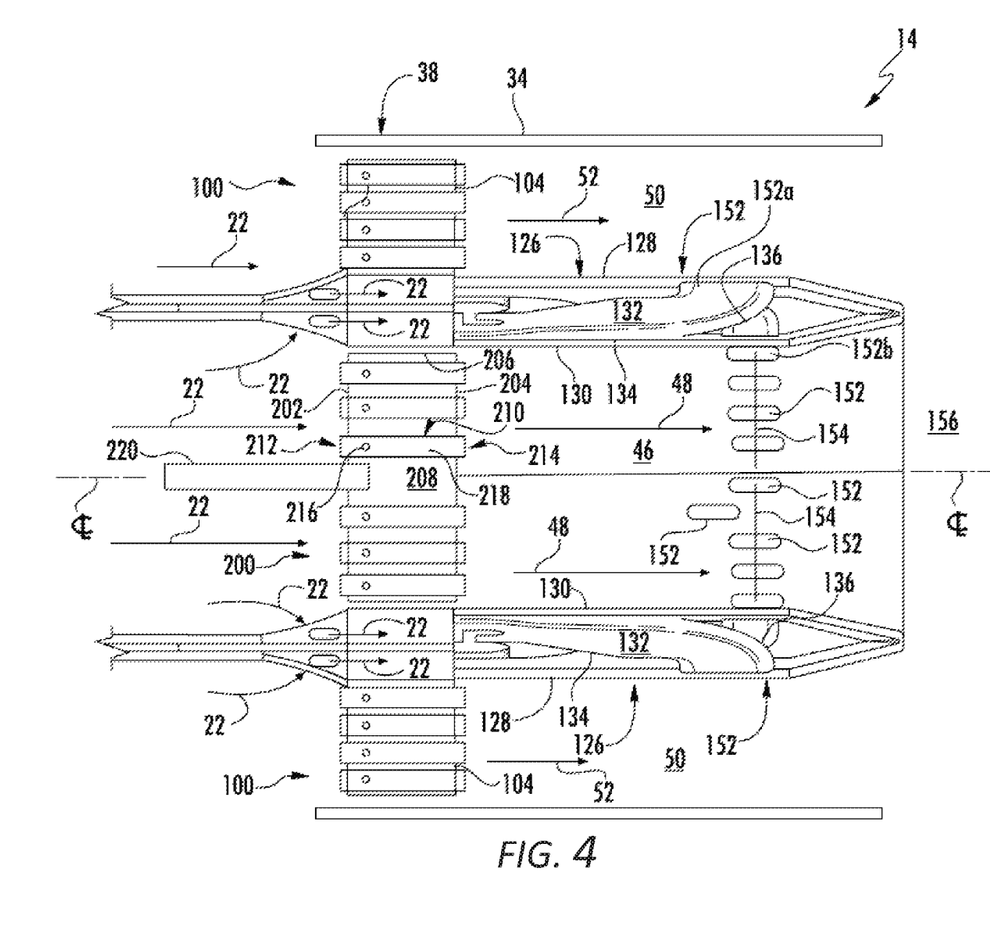
FIG. 4 is a cross-sectioned side view of a portion of the combustor as shown in FIG. 3, according to at least one embodiment of the present disclosure.

FIG. 3 provides an upstream view of a portion of the combustor 14, according to at least one embodiment of the present disclosure. FIG. 4 provides a cross-sectioned side view of a portion of the combustor 14, according to at least one embodiment of the present disclosure. As shown in FIGS. 2A, 3 and 4 collectively, the combustor 14 includes a plurality of nozzle segments 100 annularly arranged about a center fuel nozzle 200. Although FIG. 3 illustrates four individual nozzle segments 100, the combustor 14 may include two or more nozzle segments 100 and is not limited to four nozzle segments 100, unless otherwise recited in the claims. Although the nozzle segments 100 are illustrated herein as being pie or wedge shaped, the nozzle segments 100 may have other shapes such as square, rectangular, trapezoidal, or other shapes, and the shape of the nozzle segments 100 is not limited to any particular shape, unless otherwise recited in the claims. Although the center nozzle 200 is illustrated herein as being round, the center fuel nozzle 200 may have other shapes such as square, rectangular, trapezoidal, or other shapes, and the shape of the center fuel nozzle 200 is not limited to any particular shape, unless otherwise recited in the claims.

As shown in FIGS. 2A and 4, in particular embodiments, the upstream end 38 of the combustion liner 34 may at least partially circumferentially surround at least a portion of the nozzle segments 100. The nozzle segments 100 and the center fuel nozzle 200 may be coupled to the end cover 32 to form a combustion module.

Figure 5:
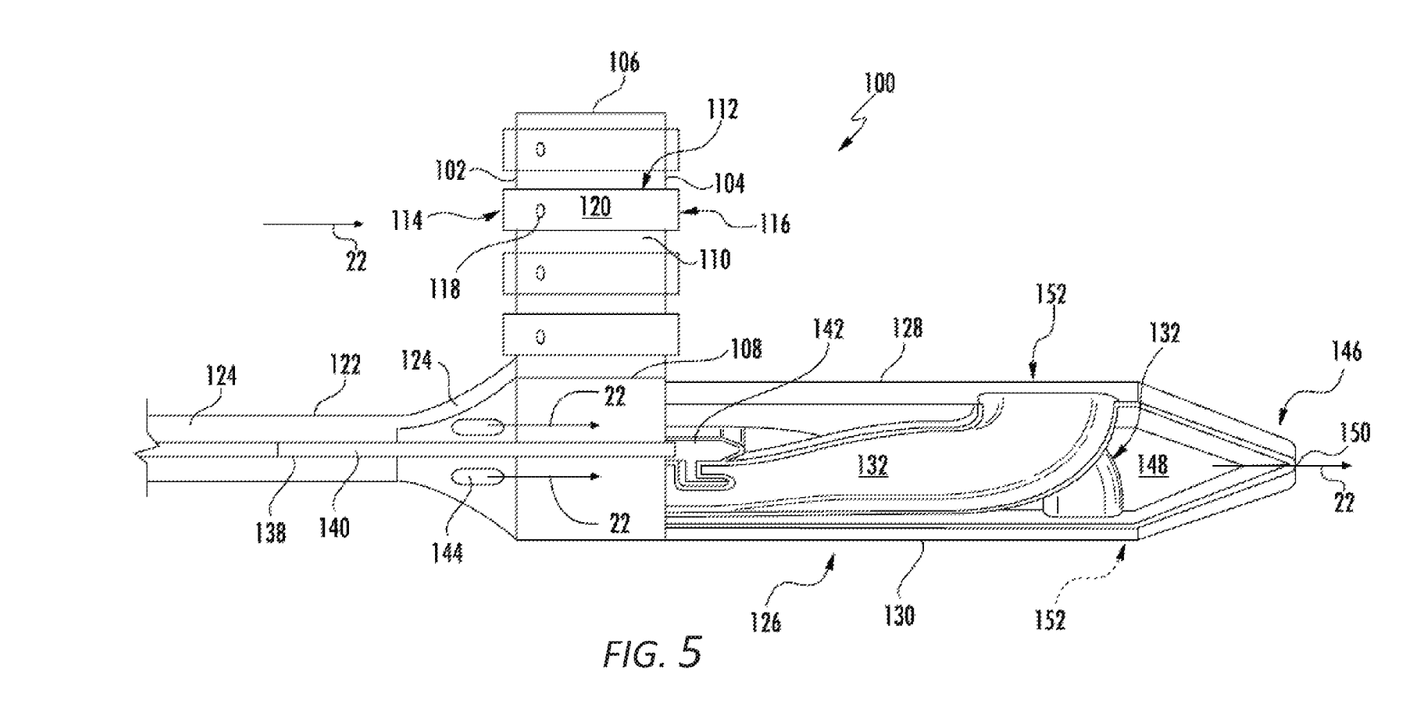
FIG. 5 is an enlarged cross-sectioned side view of an exemplary fuel nozzle segment, according to at least one embodiment of the present disclosure.

FIG. 5 is an enlarged cross-sectioned side view of an exemplary fuel nozzle segment 100, according to at least one embodiment of the present disclosure. As shown in FIG. 5, each nozzle segment 100 of the plurality of nozzle segments 100 includes a forward plate 102, an aft plate 104 that is axially offset from the forward plate 102 with respect to an axial centerline of the combustor 14, an outer band 106 and an inner band or wall 108. A fuel plenum 110 may be at least partially defined between the forward plate 102, the aft plate 104 and the outer band 106.

A plurality of tubes 112 extends through the forward plate 102, the fuel 110 plenum and the aft plate 104. Each tube 112 includes an inlet end or opening 114 disposed at or upstream from the forward plate 102 and an outlet end or opening 116 disposed downstream and/or extending axially away from the aft plate 104. In various embodiments, one or more of the tubes 112 includes one or more fuel ports 118 in fluid communication with the fuel plenum 110. Each tube 112 defines a passage or premix passage 120 through the respective nozzle segment 100. Fuel may be supplied to the fuel plenum 110 via one or more fluid conduits or pipes. For example, in particular embodiments, an outer fluid conduit 122 may define a passage 124 between a fuel supply (not shown) and the fuel plenum 110. In operation, fuel from the fuel plenum 110 may be injected into a respective premix passage 120, via fuel port(s) 118, where it is mixed with the compressed air 22 from the high pressure plenum 30.

In various embodiments, as shown in FIGS. 2A, 3, 4 and 5 collectively, the nozzle segment 100 includes a panel fuel injector 126. As shown in FIGS. 4 and 5, the panel fuel injector 126 extends axially downstream from the aft plate 104. As shown in FIG. 5, the panel fuel injector 126 includes an outer or radially outer wall 128 having an arcuate or curved shape about the centerline of the combustor 14. The outer wall 128 is disposed radially inwardly from the combustion liner 34 (FIG. 4). The panel fuel injector 126 further includes an inner or radially inner wall 130 having an arcuate or curved shape about the centerline of the combustor 14 and disposed radially outwardly from the center fuel nozzle 200.

As shown collectively in FIGS. 4 and 5, each panel fuel injector 126 includes a respective plurality of premix channels 132 defined between the outer wall 128 and the inner wall 130. In particular embodiments, one or more premix channels 132 may include a substantially linear or straight portion 134 and a curved portion 136. Each premix channel 132 of the plurality of premix channels 132 is in fluid communication with a fuel supply (not shown). For example, in particular embodiments, as shown in FIG. 5, an inner fluid conduit 138 may be disposed within the outer fluid conduit 122. The inner fluid conduit 138 may define an inner flow passage 140 between the fuel supply and the premix channels 132 and/or a fuel distribution plenum 142 defined within the panel fuel injector 126.

In particular embodiments, each premix channel 132 is in fluid communication with a compressed air supply, such as the high pressure plenum 30. In particular embodiments, as shown in FIG. 5, the outer conduit 122 may define more or more apertures 144 which provide for fluid communication between the high pressure plenum 30 and the panel fuel injector 126 and/or the premix channels 132.

In particular embodiments, as shown in FIG. 5, the inner wall 130 and the outer wall 128 of the panel fuel injector 126 connect at a downstream end 146 of the panel fuel injector 126. A cooling air cavity 148 is defined between the inner wall 130 and the outer wall 128 at the downstream end 146. The cooling air cavity 148 may be in fluid communication with the compressed air supply. The panel fuel injector 126 further includes at least one aperture 150, which is in fluid communication with the cooling air cavity 148 and which is defined proximate to the downstream end 146 of the panel fuel injector 126. The aperture(s) 150 provide for fluid flow out of the cooling air cavity 148.

In various embodiments, as shown in FIGS. 4 and 5 collectively, a plurality of outlets 152 is defined along at least one of the outer wall 128 and the inner wall 130. Each premix channel 132 terminates at a respective outlet 152 of the plurality of outlets 152. The plurality of outlets 152 is axially offset from the aft plate 104 of the nozzle segment 100. The plurality of outlets 152 defines an injection plane 154 downstream from the center fuel nozzle 200 and/or the respective fuel nozzle segments 100 and upstream from a tertiary combustion zone 156 defined downstream from the outlets 152. In particular embodiments, one or more outlets 152 of the plurality of outlets 152 are defined along the outer wall 128. In particular embodiments, at least one outlet 152 of the plurality of outlets 152 is defined along the inner wall 130. In particular embodiments, at least one outlet 152 of the plurality of outlets 152 is defined along the outer wall 128, and at least one outlet 152 of the plurality of outlets 152 is defined along the inner wall 130. In particular embodiments, as shown in FIG. 4, a first outlet 152(*a*) of the plurality of outlets 152 is formed along the outer wall 128, and a second outlet 152(*b*) of the plurality of outlets 152 is formed along the inner wall 130 with the first outlet 152(*a*) being larger than the second outlet 152(*b*).

In particular embodiments, as shown in FIG. 4, two or more outlets 152 of the plurality of outlets 152 may be axially offset from each other. In one embodiment, two or more outlets 152 defined along the inner wall 130 may be axially offset from each other. In one embodiment, two or more outlets 152 defined along the outer wall 128 may be axially offset from each other. In one embodiment, at least one outlet 152 defined along the inner wall 130 may be axially offset from at least one outlet 128 defined along the outer wall 128.

As shown in FIG. 4, the respective panel fuel injectors 126 of the respective nozzle segments 100 of the plurality of nozzle segments 100 collectively define a primary combustion chamber 46 downstream from the center fuel nozzle 200 and upstream from the plurality of outlets 152. In particular embodiments, where at least one outlet 152 of the plurality of outlets 152 is defined along the inner wall 130, the at least one outlet 152 may be oriented or formed to direct a fuel-air mixture at an angle or perpendicular to a flow of combustion gases 48 produced in the primary combustion chamber 46 downstream from the center fuel nozzle 200.

In particular embodiments, the combustion liner 34 and the respective outer wall 128 of each panel fuel injector 100 define an annular secondary combustion chamber 50 therebetween downstream from the outlet ends 116 of the tubes 112 and radially outwardly from the primary combustion chamber 46. In particular embodiments, where at least one outlet 152 of the plurality of outlets 152 is defined along the outer wall 128, the at least one outlet 152 may be oriented or formed to direct a fuel-air mixture at an angle or perpendicular to a flow of combustion gases 52 flowing downstream from the secondary combustion chamber 50 between the outer wall 128 and the combustion liner 34.

In various embodiments, as shown in FIG. 4, the center fuel nozzle 200 includes a forward plate 202, an aft plate 204 that is axially offset from the forward plate 202 with respect to an axial centerline of the combustor 14, and an outer band 206 that defines a radially outer perimeter of the center fuel nozzle 200. A fuel plenum 208 is at least partially defined between the forward plate 202, the aft plate 204 and the outer band 206.

A plurality of tubes 210 extends through the forward plate 202, the fuel 208 plenum and the aft plate 204. Each tube 210 includes an inlet end or opening 212 disposed at or upstream from the forward plate 202 and an outlet end or opening 214 disposed downstream and/or extending axially away from the aft plate 204. In various embodiments, one or more of the tubes 210 includes one or more fuel ports 216 in fluid communication with the fuel plenum 208. Each tube 210 defines a passage or premix passage 218 through the center fuel nozzle 200 where fuel from the fuel plenum 208 may be mixed with the compressed air 22 from the high pressure plenum 30. The fuel plenum 208 may be fluidly coupled to a fuel supply via a first fluid conduit 220.

Figure 6:
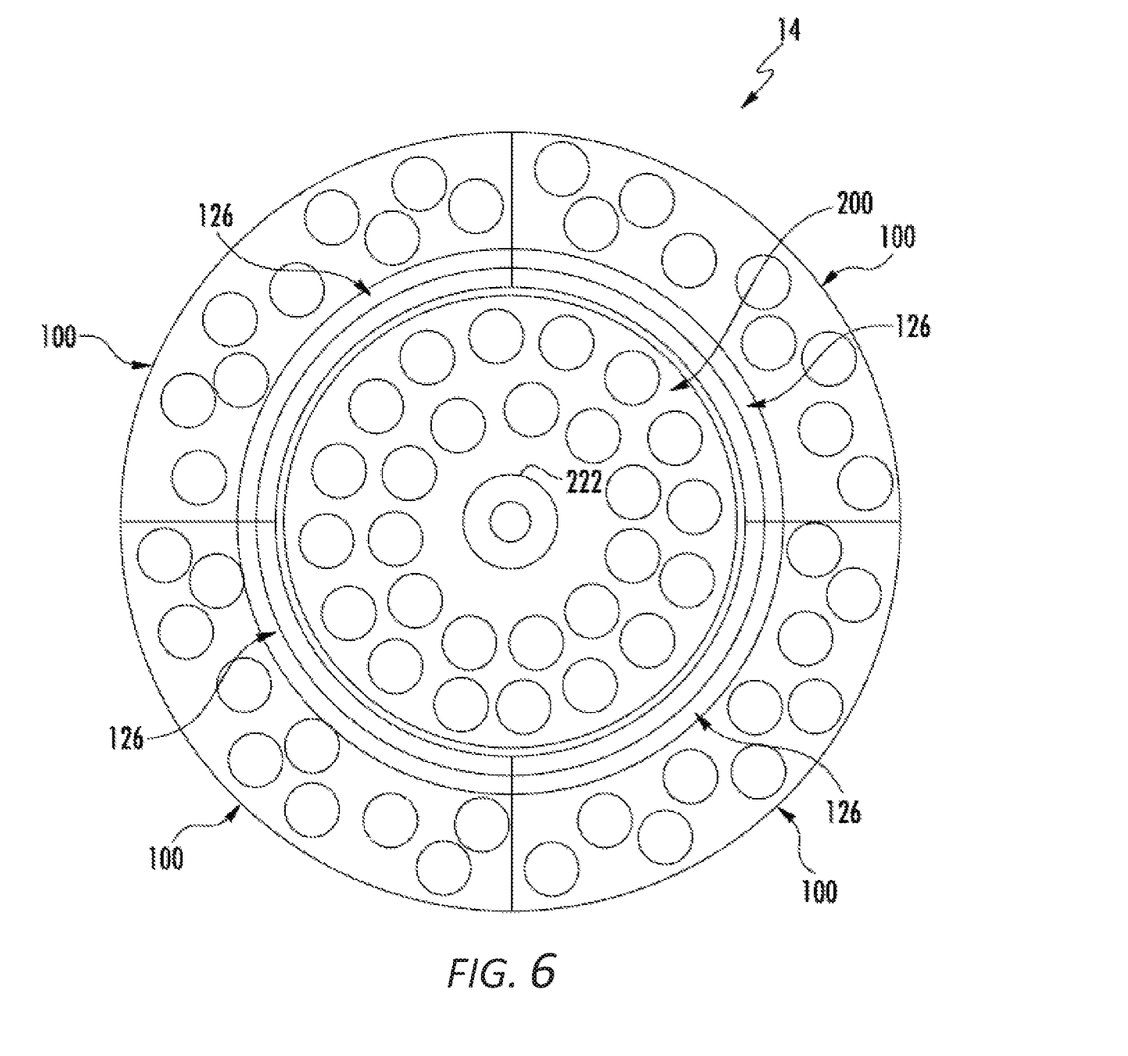
FIG. 6 is an upstream view of a portion of an exemplary combustor, according to at least one embodiment of the present disclosure.
Figure 7:
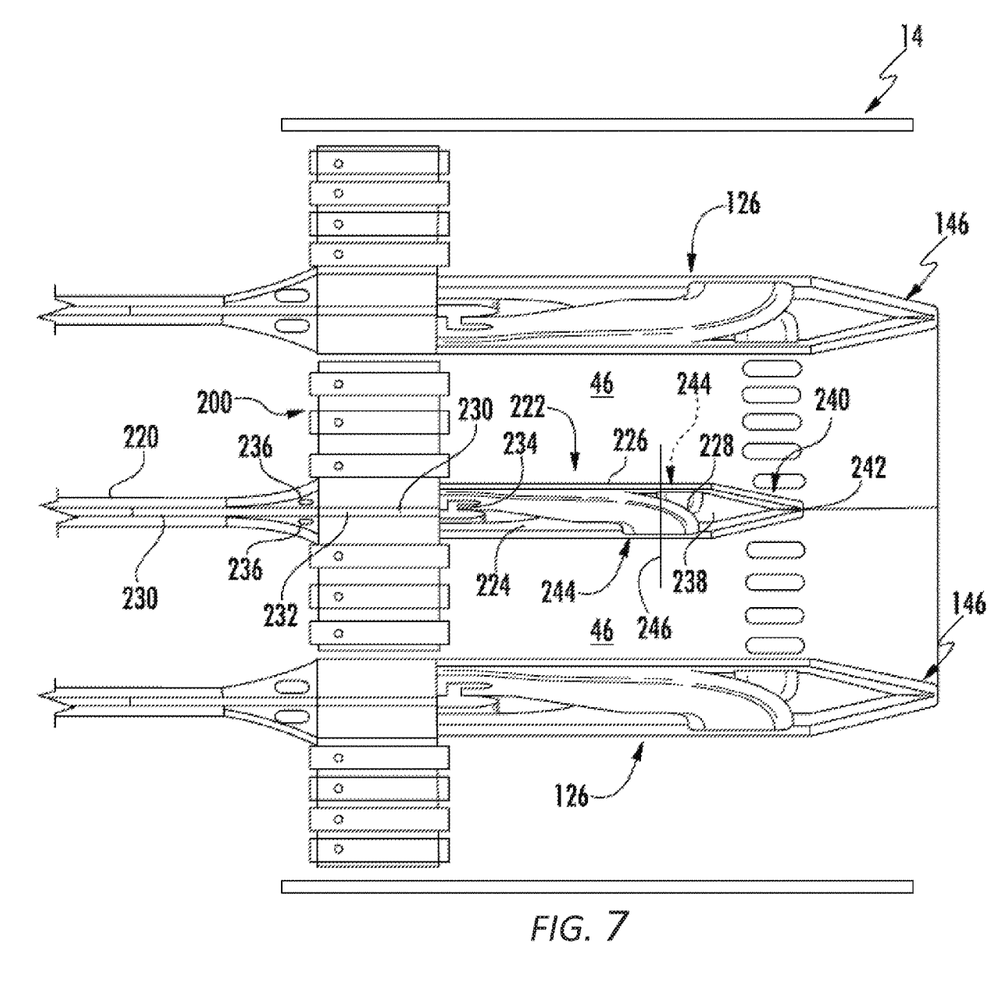
FIG. 7 provides a cross-sectioned side view of a portion of the combustor as shown in FIG. 6, according to at least one embodiment of the present disclosure.

FIG. 6 provides an upstream view of a portion of the combustor 14, according to at least one embodiment of the present disclosure. FIG. 7 provides a cross-sectioned side view of a portion of the combustor 14 as shown in FIG. 6, according to at least one embodiment of the present disclosure. In particular embodiments, as shown in FIGS. 6 and 7, the center fuel nozzle 200 comprises a tube body 222 that extends axially downstream from the aft plate 204. As shown in FIGS. 6 and 7 collectively, the tube body 222 is at least partially surrounded by the panel fuel injectors 126 of each respective nozzle segment 100. In particular embodiments, the tube body 222 may terminate axially upstream from the downstream ends 146 of the fuel injection panels 126.

As shown in FIG. 7, the tube body 222 includes a plurality of premix channels 224 defined within the tube body 222. In particular embodiments, one or more premix channels 224 may include a substantially linear or straight portion 226 and a curved portion 228. Each premix channel 224 of the plurality of premix channels 224 is in fluid communication with a fuel supply (not shown). For example, in particular embodiments, as shown in FIG. 7, a second fluid conduit 230 may be disposed within the first fluid conduit 220. The second fluid conduit 230 may define an inner flow passage 232 between the fuel supply and the premix channels 224 and/or a fuel distribution plenum 234 defined within the tube body 222.

In particular embodiments, each premix channel 224 is in fluid communication with a compressed air supply, such as the high pressure plenum 30. In particular embodiments, as shown in FIG. 7, the first fluid conduit 220 may define more or more apertures 236, which provide for fluid communication between the high pressure plenum 30 and the tube body 222 and/or the premix channels 224.

In particular embodiments, as shown in FIG. 7, a cooling air cavity 238 is defined at a downstream end 240 of the tube body 222. The cooling air cavity 238 may be in fluid communication with the compressed air supply. At least one aperture 242 may be defined proximate to the downstream end 240 of the tube body 222. The aperture(s) 242 may be in fluid communication with the cooling air cavity 238. The aperture(s) 242 provide for fluid flow out of the cooling air cavity 238 at a location that is downstream from the primary combustion chamber 46.

In various embodiments, as shown in FIG. 7, the tube body 222 includes and/or defines a plurality of outlets 244 defined proximate to the downstream end 240. Each premix channel 224 terminates at a respective outlet 244 of the plurality of outlets 244. The plurality of outlets 244 is axially offset from the aft plate 204 of the center fuel nozzle 200. The outlets 244 of the plurality of outlets 244 are circumferentially spaced along the tube body 222. In particular embodiments, the plurality of outlets 244 is disposed upstream from the downstream ends 146 of the respective fuel injection panels 126. In particular embodiments, two or more outlets 244 of the plurality of outlets 244 may be axially offset from each other.

In operation, compressed air 22 flows from the head end volume 44 into each of the tubes 112 of the nozzle segments 100 and the tubes 210 of the center fuel nozzle 200. Depending on the operation mode of the combustor 14, fuel is supplied to the respective fuel plenums 110 of each nozzle segment 100 and/or to the fuel plenum 208 of the center fuel nozzle 200. The fuel may then be injected into the respective premix passage(s) 120, 218 before being injected into the primary or secondary combustion chambers 46, 50.

The center fuel nozzle 200 produces a hot effluent stream of combustion gases 48 in the primary combustion chamber 46, which moves downstream towards outlets 152 defined along the inner wall 130 of the panel fuel injectors 126. A second fuel-air stream from the panel fuel injectors 126 and/or from the tube body 222 is injected into the hot effluent stream via the respective outlets 152, 244. The second fuel-air stream mixes with the hot effluent stream and is reacted in the tertiary combustion zone 156 defined downstream from outlets 152, 244. The flow of fuel into the primary combustion chamber 46, approximately 50%-70% of total, is accelerated until reaching the injection plane 154 defined by the outlets 152 and/or an injection plane 246 defined by the tube body 222 outlets 244, where the second fuel-air mixture is added. Such an arrangement enables sufficient time to achieve CO burnout at a lower temperatures while minimizing NOx formation in the primary combustion chamber 46 and prior to elevating gas temps between the injection plane 154 and the turbine inlet 36, thereby minimizing overall NOx emissions. The hardware arrangement of the exemplary combustor 14 as described herein and as shown in FIGS. 3 through 7, may be duplicated for each combustion can of the gas turbine 10.

Figure 8:
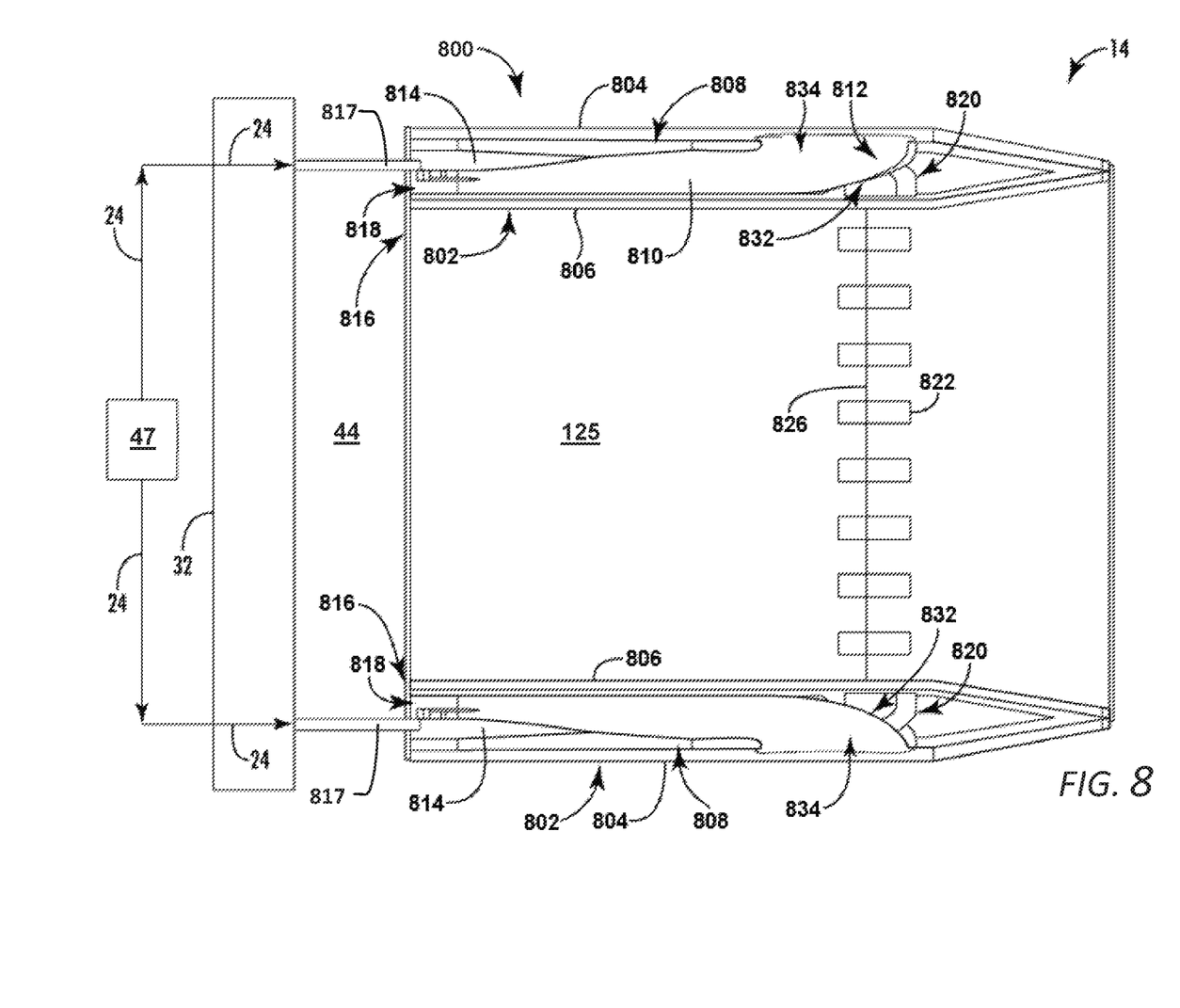
FIG. 8 is a cross-sectioned side view of a portion of the combustor as shown in FIG. 2B, according to particular embodiments of the present disclosure.

FIG. 8 provides a cross-sectioned side view of a portion of the combustor 14 as shown in FIG. 2B with the primary fuel nozzle 45 removed, according to particular embodiments of the present disclosure. In various embodiments, as shown in FIGS. 2B and 8, the combustor 14 includes a fuel injector 800 that extends axially downstream from the endcover 32 and/or the head-end volume 44. As shown in FIG. 8, the fuel injector 800 may be fluidly coupled to a fuel supply 47 via the end cover 32. The fuel injector 800 includes a cylindrical shell 802 formed by an outer wall 804 that is radially spaced from an inner wall 806. In particular embodiments, as shown in FIG. 2B, the inner wall 806 of the fuel injector 800 circumferentially surrounds at least a portion of the primary fuel nozzle 45.

As shown in FIG. 8, a plurality of premix channels 808 is defined within the cylindrical shell 802 between the outer wall 804 and the inner wall 806. The premix channels 808 of the plurality of premix channels 808 are circumferentially spaced apart within the cylindrical shell 802. In particular embodiments, as shown in FIG. 8, one or more premix channels 808 of the plurality of premix channels 808 may include, in serial flow order, a substantially linear or straight portion 810 and a curved portion 812. The curved portion 812 may direct the respective premix channel 808 towards one of the inner wall 806 or the outer wall 804.

In particular embodiments, as shown in FIG. 8, at least one fuel plenum 814 is defined within the cylindrical shell 802 between the outer wall 804 and the inner wall 806. The fuel plenum(s) 814 may be in fluid communication with the fuel supply 47 and/or the endcover 32 via one or more fluid conduits 817. Each premix channel 808 of the plurality of premix channels 808 is in fluid communication with the fuel plenum(s) 814 via one or more fuel ports or apertures. In particular embodiments, each premix channel 808 of the plurality of premix channels 808 is in fluid communication with a compressed air supply such as the high pressure plenum 30 (FIG. 2B). For example, an upstream end 816 of the fuel injector 800 may include one or more openings 818, which provide for fluid communication between the head-end volume 44 and/or the high pressure plenum 30 and the respective premix channels 808.

In particular embodiments, as shown in FIG. 8, the plurality of premix channels 808 includes a first plurality of premix channels 820. Each premix channel 820 of the first plurality of premix channels 820 is in fluid communication with a respective outlet 822 of a first plurality of outlets 822. The outlets 822 of the first plurality of outlets 822 are circumferentially spaced across or along the inner wall 806. In particular embodiments, as shown in FIGS. 2B and 8 collectively, the inner wall 806 defines a primary combustion chamber 125 downstream from the primary fuel nozzle 45 and upstream from the first plurality of outlets 822. The first plurality of outlets 822 collectively defines an annular, or radially-oriented circumferential injection plane 826 downstream from the primary combustion chamber 125.

Figure 9:
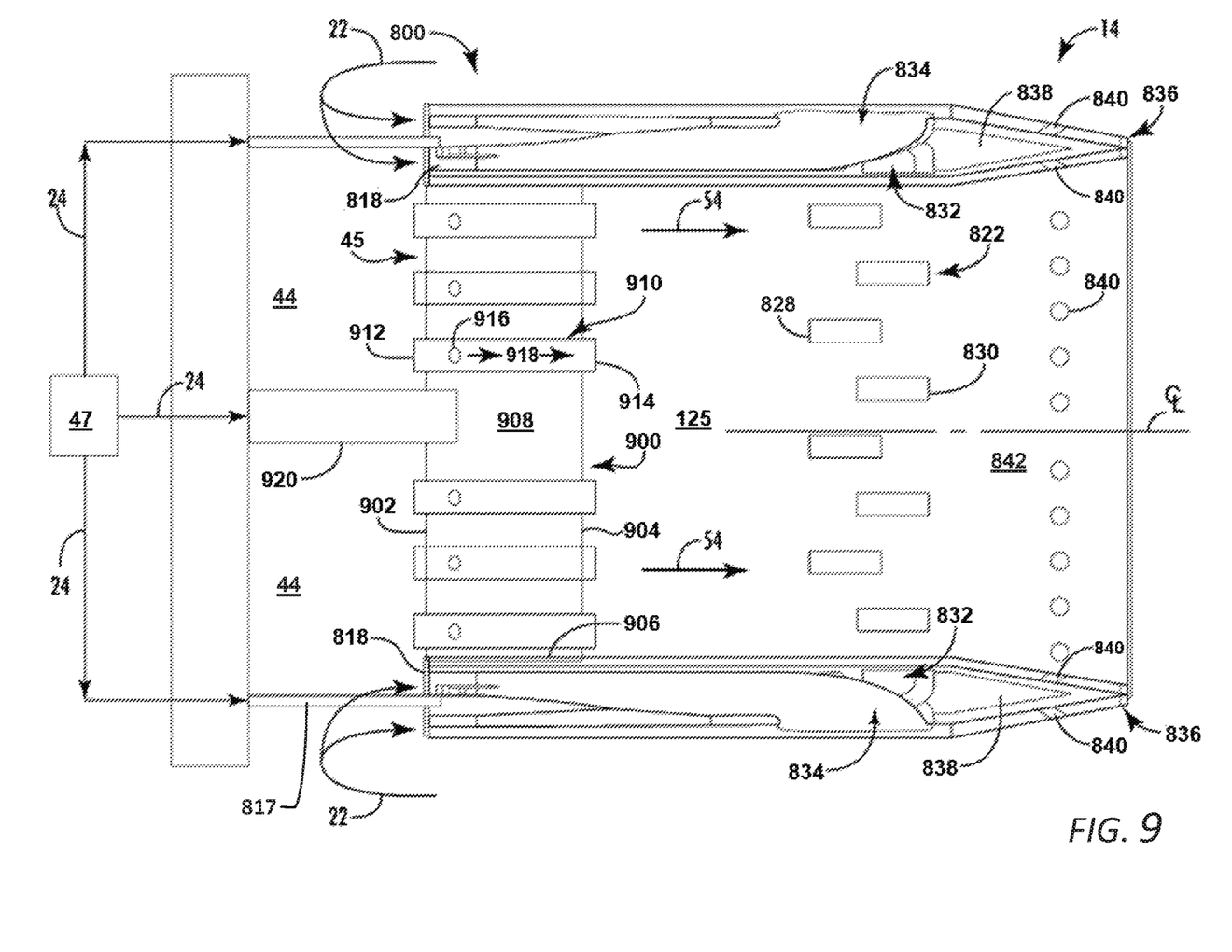
FIG. 9 is a cross-sectioned side view of a portion of the combustor as shown in FIG. 2B, according to particular embodiments of the present disclosure.

FIG. 9 provides a cross-sectioned side view of a portion of the combustor 14 as shown in FIG. 8, with an exemplary primary fuel nozzle 45 in situ, according to particular embodiments of the present disclosure. In particular embodiments, as shown in FIG. 9, two or more outlets 822 of the first plurality of outlets 822 may be axially offset from each other. For example, in one embodiment, a first outlet 828 or first set of outlets of the first plurality of outlets 822 is axially offset from a second outlet 830 or second set of outlets of the first plurality of outlets 822.

In particular embodiments, as shown in FIGS. 8 and 9, the plurality of premix channels 808 further includes a second plurality of premix channels 832. Each premix channel 832 of the second plurality of premix channels 832 terminates at a respective outlet 834 of a second plurality of outlets 834. The outlets 834 of the second plurality of outlets 834 are circumferentially spaced across or along the outer wall 804. Each premix channel 832 of the second plurality of premix channels 832 is in fluid communication with the fuel supply 47, the compressed air supply (such as the high pressure plenum 30) and a respective outlet 834 of the second plurality of outlets 834. In particular embodiments, two or more outlets 834 of the second plurality of outlets 834 may be axially offset from each other.

In particular embodiments, as shown in FIG. 9, the inner wall 806 and the outer wall 804 of the fuel injector 800 connect at a downstream end 836 of the fuel injector 800. A cooling air cavity 838 is defined between the inner wall 806 and the outer wall 804 at the downstream end 836. The cooling air cavity 838 may be in fluid communication with the compressed air supply, such as the high pressure plenum 30. The fuel injector 800 further includes at least one aperture 840, which is in fluid communication with the cooling air cavity 838 and which is defined proximate to the downstream end 836 of the fuel injector 800. The aperture(s) 840 provide for fluid flow out of the cooling air cavity 838 downstream from the outlets 822, 834.

The primary fuel nozzle 45 may comprise any fuel nozzle and is not limited to any particular type of fuel nozzle, unless otherwise recited in the claims. For example, the primary fuel nozzle 45 may comprise a premix type fuel nozzle typically known in the industry. In one embodiment, as shown in FIG. 9, the primary fuel nozzle 45 may comprise a bundled tube type fuel nozzle 900. The bundled tube type fuel nozzle comprises a forward plate 902, an aft plate 904 that is axially offset from the forward plate 902 with respect to an axial centerline of the combustor 14, and an outer band 906 that defines a radially outer perimeter of the primary fuel nozzle 900. A fuel plenum 908 is at least partially defined between the forward plate 902, the aft plate 904 and the outer band 906.

A plurality of tubes 910 extends through the forward plate 902, the fuel plenum 908 and the aft plate 904. Each tube 910 includes an inlet end or opening 912 disposed at or upstream from the forward plate 902 and an outlet end or opening 914 disposed downstream and/or extending axially away from the aft plate 904. In various embodiments, one or more of the tubes 910 includes one or more fuel ports 916 in fluid communication with the fuel plenum 908. Each tube 910 defines a passage or premix passage 918 through the primary fuel nozzle 900 where fuel from the fuel plenum 908 may be mixed with the compressed air 22 from the high pressure plenum 30. The fuel plenum 908 may be fluidly coupled to the fuel supply 47 via a fluid conduit 920.

Figure 10:
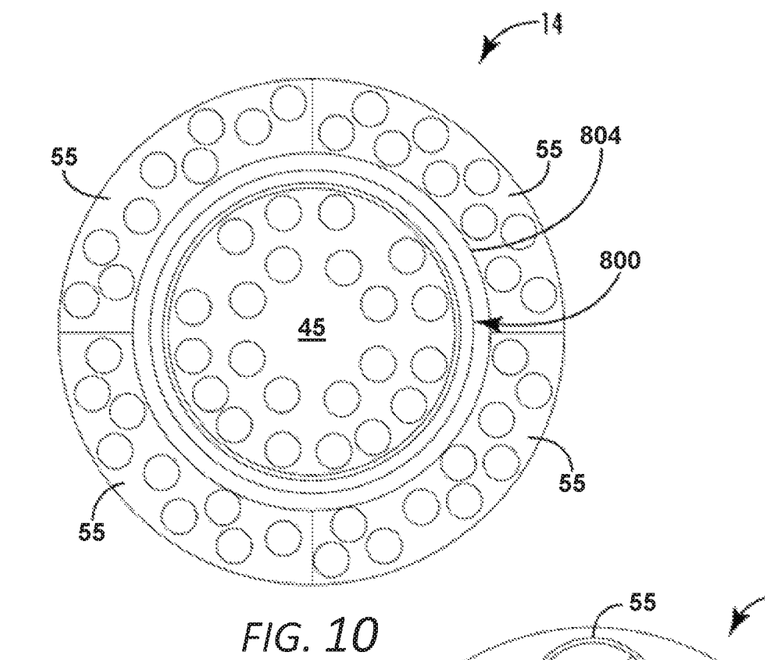
FIG. 10 is an upstream view of the combustor as shown in FIG. 2B, according to various embodiments of the present disclosure.
Figure 11:
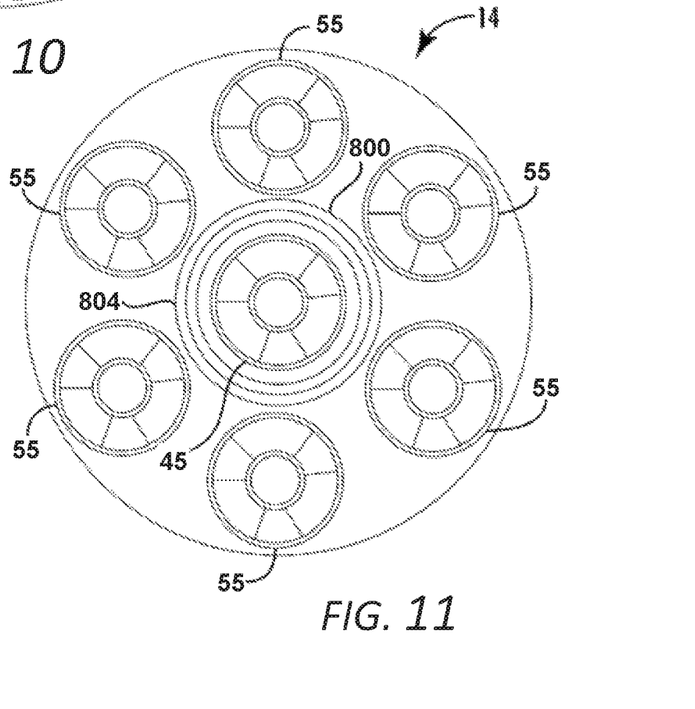
FIG. 11 is an upstream view of the combustor as shown in FIG. 2B, according to various embodiments of the present disclosure.

FIGS. 10 and 11 provide upstream views of the combustor 14, according to various embodiments of the present disclosure. In particular embodiments, as shown in FIGS. 10 and 11, the combustor 14 may include a plurality of secondary fuel nozzles 55. The secondary fuel nozzles 55 may extend downstream from the endcover 32 and may be annularly arranged around the fuel injector 800 outer wall 804 and/or around the primary fuel nozzle 45. The secondary fuel nozzles 55 may be pie or wedge shaped or may be round and are not limited to any particular shape or type of fuel nozzle unless otherwise recited in the claims.

In operation, compressed air 22 flows from the high pressure plenum 30 to the head-end volume 44. A first portion of the compressed air 22 flows into the openings 818 of the premix channels 808 of the fuel injector 800. A second portion of the compressed air flows into the primary fuel nozzle 45. The primary fuel nozzle 45 produces a hot effluent stream of combustion gases 54 (FIG. 9) in the primary combustion chamber 125, which moves downstream towards outlets 822 or 828, 830 defined along the inner wall 806 of the fuel injector 800. A second fuel-air stream from the fuel injector 800 is injected into the hot effluent stream via respective outlets 822, 828, 830. The second fuel-air stream mixes with the hot effluent stream and is reacted in a secondary combustion zone 842 defined downstream from outlets 822 or 828, 830, 834. The flow of fuel into the primary combustion chamber 125, approximately 50%-70% of total fuel, is accelerated until reaching the circumferential injection plane 826 (FIG. 8) defined by the outlets 822 or 828, 830, 834 where the second fuel-air mixture is added. Such an arrangement enables sufficient time to achieve CO burnout at lower temperatures while minimizing NOx formation in the primary combustion chamber 125 and prior to elevating gas temperatures between the injection plane 826 and the turbine inlet 36, thereby minimizing overall NOx emissions. The hardware arrangement of the exemplary combustor 14, as described herein and as shown in FIGS. 2B and 8 through 11, may be duplicated for each combustion can of the gas turbine 10.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A combustor, comprising:
   an endcover; and
   a fuel injector extending axially downstream from the endcover, the fuel injector including an annular shell formed by an outer wall and an inner wall, a first plurality of outlets circumferentially spaced across the inner wall, and a first plurality of premix channels defined between the outer wall and the inner wall, wherein each premix channel of the first plurality of premix channels is in fluid communication with a fuel supply, a compressed air supply and a respective outlet of the first plurality of outlets.

2. The combustor as in claim 1, wherein the inner wall and the outer wall of the fuel injector connect at a downstream end of the fuel injector; and wherein a cooling air cavity is defined between the inner wall and the outer wall at the downstream end.

3. The combustor as in claim 2, wherein the fuel injector includes at least one aperture in fluid communication with the cooling air cavity and defined proximate to the downstream end of the fuel injector.

4. The combustor as in claim 1, further comprising a fuel nozzle extending downstream from the endcover and disposed upstream from the first plurality of outlets.

5. The combustor as in claim 4, wherein the inner wall of the fuel injector circumferentially surrounds at least a portion of the fuel nozzle.

6. The combustor as in claim 1, wherein the inner wall of the fuel injector defines a combustion chamber upstream from the first plurality of outlets.

7. The combustor as in claim 6, wherein the first plurality of outlets defines an annular injection plane downstream from the combustion chamber.

8. The combustor as in claim 1, wherein a first outlet of the first plurality of outlets is axially offset from a second outlet of the first plurality of outlets.

9. The combustor as in claim 1, wherein the fuel injector further comprises a second plurality of outlets circumferentially spaced across the outer wall and a second plurality of premix channels defined between the outer wall and the inner wall; and wherein each premix channel of the second plurality of premix channels is in fluid communication with the fuel supply, the compressed air supply and a respective outlet of the second plurality of outlets.

10. The combustor as in claim 8, wherein a first outlet of the second plurality of outlets is axially offset from a second outlet of the second plurality of outlets.

11. A combustor, comprising:
    an endcover;
    a fuel nozzle extending downstream from the endcover; and
    a fuel injector extending axially downstream from the endcover, the fuel injector including an annular shell formed by an outer wall and an inner wall, a first plurality of outlets circumferentially spaced across the inner wall, and a first plurality of premix channels defined between the outer wall and the inner wall, wherein the inner wall defines a primary combustion chamber downstream from the fuel nozzle, and wherein each premix channel of the first plurality of premix channels is in fluid communication with a fuel supply, a compressed air supply and a respective outlet of the first plurality of outlets.

12. The combustor as in claim 11, wherein the inner wall and the outer wall of the fuel injector connect at a downstream end of the fuel injector, wherein a cooling air cavity is defined between the inner wall and the outer wall at the downstream end.

13. The combustor as in claim 12, wherein the fuel injector includes at least one aperture in fluid communication with the cooling air cavity and defined proximate to the downstream end of the fuel injector.

14. The combustor as in claim 11, wherein the inner wall of the fuel injector circumferentially surrounds at least a portion of the fuel nozzle.

15. The combustor as in claim 11, wherein the primary combustion chamber is defined upstream from the first plurality of outlets.

16. The combustor as in claim 15, wherein the first plurality of outlets defines an annular injection plane downstream from the primary combustion chamber.

17. The combustor as in claim 11, wherein a first outlet of the first plurality of outlets is axially offset from a second outlet of the first plurality of outlets.

18. The combustor as in claim 11, wherein the fuel injector further comprises a second plurality of outlets circumferentially spaced across the outer wall and a second plurality of premix channels defined between the outer wall and the inner wall, wherein each premix channel of the second plurality of premix channels is in fluid communication with the fuel supply, the compressed air supply and a respective outlet of the second plurality of outlets.

19. The combustor as in claim 18, wherein a first outlet of the second plurality of outlets is axially offset from a second outlet of the second plurality of outlets.

20. The combustor as in claim 11, further comprising a plurality of secondary fuel nozzles extending downstream from the endcover and annularly arranged around the fuel injector outer wall.

\* \* \* \* \*